(No Model.)
D. RYLANDS.
METHOD OF FORMING INDENTS, &c., IN INTERNALLY STOPPERED BOTTLES.
No. 376,915. Patented Jan. 24, 1888.
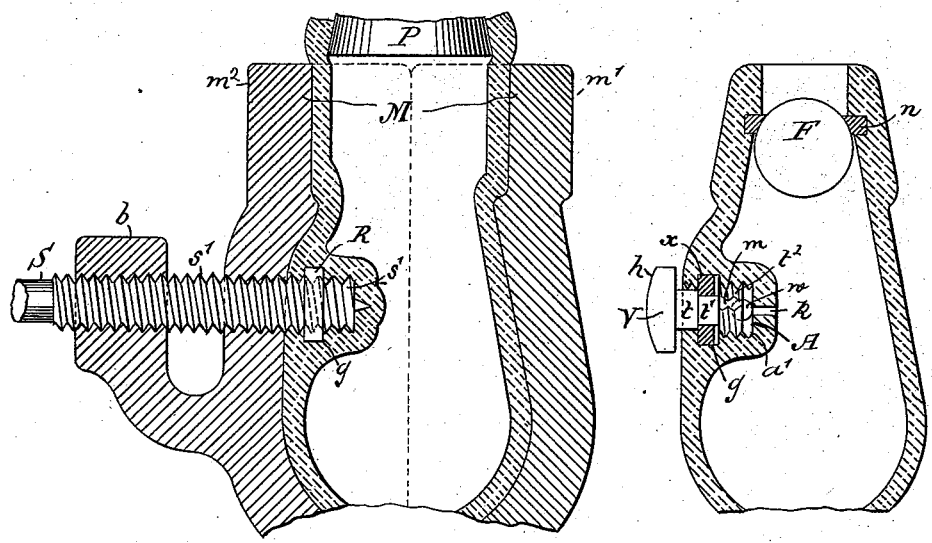
WITNESSES:
Edward Wolff
William Miller
INVENTOR
Dan Rylands.
BY
Van Santvoord & Hauff
ATTORNEYS

UNITED STATES PATENT OFFICE.

DAN RYLANDS, OF STAIRFOOT, NEAR BARNSLEY, COUNTY OF YORK, ENGLAND.

METHOD OF FORMING INDENTS, &c., IN INTERNALLY-STOPPERED BOTTLES.

SPECIFICATION forming part of Letters Patent No. 376,915, dated January 24, 1888.

Application filed March 24, 1887. Serial No. 232,298. (No model.) Patented in England February 19, 1887, No. 2,580.

*To all whom it may concern:*

Be it known that I, DAN RYLANDS, a subject of the Queen of Great Britain, residing at Stairfoot, near Barnsley, in the county of York, England, have invented new and useful Improvements in the Manufacture of Internally-Stoppered Bottles, (for which Letters Patent have been granted in England February 19, 1887, No. 2,580,) of which the following is a specification.

This invention relates to improvements in the method of forming indents, &c., in internally-stoppered bottles; and the objects of my improvements are to improve upon my previous inventions relating to that class. I attain these objects by the means and in the manner pointed out and described in the following specification, reference being had to the accompanying drawings, in which—
Figure 1 is a sectional elevation of the top portion of the mold wherein the bottle is blown, and shows a section of the neck of one form of improved bottle blown therein and connected to an ordinary blow-pipe. Fig. 2 is a sectional elevation of the improved bottle-neck blown in the mold shown in Fig. 1.

Similar letters refer to similar parts.

Referring to Fig. 1, the mold M is made in two portions, $m'\, m^2$, which are hinged together at the bottom in the ordinary manner. In connection with the said mold M is a spindle, S, a portion, $s'$, of which is threaded and screws through a boss, $b$, which can be attached to the part $m^2$ of mold M, as shown, or can be attached to any other suitable article.

When the mold M is prepared for receiving the viscous or molten glass for forming the bottle, the threaded end $s'$ of the spindle S projects a suitable distance within the mold M, and on this projecting portion $s'$ of the spindle S is placed (in a suitable position) a ring of asbestus or other suitable substance, R. The viscous or molten glass attached to the end of the blow-pipe P, and which has been worked up on the "marver" to a suitable shape by the blower, is then placed in the mold M in the usual way, after which the halves $m'\, m^2$ of the mold M are closed, and then the bottle is blown up in the mold M, as shown. The spindle S is then caused to revolve (by any suitable mechanical means) in a direction which unscrews it from the mold M. In so doing it leaves the ring of asbestus or other substance, R, within the indent A, which the end of the screwed portion $s'$ has formed. The bottle is then taken from the mold M and handed to the bottle-maker, who forms a mouth thereon and punches the hole $k$ through the bottom of the indent A by means of suitable tools. The bottle is subsequently annealed, after which the ring R is removed from the indent A. By this means a suitable groove or under-cut, $g$, is formed within the said indent A.

Referring to Fig. 2, the valve V is preferably made of glass, and has a square or other head, $h$, and a stem which has a portion, $t$, a recessed portion, $t'$, and an enlarged portion, $t^2$, which is formed with suitable male threads to correspond with the female threads $a'$, formed in the indent A. This enlarged portion $t^2$ has any suitable number of horizontal slots, $m$. At the bottom of the portion $t^2$ is placed an india-rubber or other flexible ring or ball, $w$. Before the valve V is screwed into the indent A an india-rubber or other pliable washer, $x$, is placed onto the recessed portion $t'$, and the flexible washer or ball $w$ is also placed at the bottom of the portion $t^2$. The valve V is then screwed into the indent A, and the pliable washer $x$ is pressed in along with the valve V until it arrives at the groove or under-cut $g$, when it expands and fits itself into said groove $g$. The valve V is then fitted completely in the indent A, and cannot be entirely unscrewed or drawn from said indent A. By giving the head $h$ of valve V an unscrewing twist the ball or washer $w$ is withdrawn or forced by means of the pressure in the bottle from the hole $k$. By this means the pressure of gas in the bottle escapes out of said hole $k$ and passes along the oblong slots $m$, after which it passes out of the indent A and escapes between the head $h$ and bottle-neck.

This internally-stoppered bottle can be opened without the aid of an opener and the internal stopper, F, released from its seating $n$ without the application of any external mechanical force. To open the bottle, valve V is turned by the hand in an unscrewing direction. By this means the internal pressure escapes out of the hole $k$, when the internal stopper, F, falls, and then the contents can be poured out. When it is required to refill the bottles, the valve V must be screwed up, so that the washer *w* hermetically seals the hole *k*.

What I claim as new, and desire to secure by Letters Patent, is—

The method of forming indents and grooves or under-cuts in internally-stoppered bottles, which consists in placing a ring of asbestus or like material on the threaded portion of a spindle projecting into the mold which receives the molten glass, then blowing up the glass bottle in the closed mold, then withdrawing the spindle from the mold and ring, leaving the ring in the indented and undercut portion of the bottle, then forming a mouth on the bottle after it is removed from the mold, and finally removing the ring from the bottle, substantially as described.

In testimony whereof I have hereunto set my hand and seal in the presence of two subscribing witnesses.

DAN RYLANDS. [L. S.]

Witnesses:
 THOMAS JOHNSON,
 AARON BOSTWICK.